(12) United States Patent
Delucco (10) Patent No.: US 12,537,354 B1
(45) Date of Patent: Jan. 27, 2026

(54) TOWED VEHICLE WIRING ADAPTER WITH LOAD SWITCHING

(71) Applicant: Hopkins Manufacturing Corporation, Emporia, KS (US)

(72) Inventor: Damien Delucco, Wamego, KS (US)

(73) Assignee: HOPKINS MANUFACTURING CORPORATION, Emporia, KS (US)

( * ) Notice: Subject to any disclaimer, the term of this patent is extended or adjusted under 35 U.S.C. 154(b) by 370 days.

(21) Appl. No.: 18/192,341

(22) Filed: Mar. 29, 2023

(51) Int. Cl.
| | |
|---|---|
| H01R 31/06 | (2006.01) |
| B60D 1/64 | (2006.01) |
| H01R 13/703 | (2006.01) |
| H01R 13/717 | (2006.01) |
| H01R 13/719 | (2011.01) |

(52) U.S. Cl.
CPC ............. *H01R 31/065* (2013.01); *B60D 1/64* (2013.01); *H01R 13/7039* (2013.01); *H01R 13/7175* (2013.01); *H01R 13/719* (2013.01); *H01R 2201/26* (2013.01)

(58) Field of Classification Search
CPC .............. H01R 31/065; H01R 13/7039; H01R 13/7175; H01R 13/719
USPC ......................................................... 439/35
See application file for complete search history.

(56) References Cited

U.S. PATENT DOCUMENTS

| | | | | |
|---|---|---|---|---|
| 4,781,393 A | * | 11/1988 | Jeter | H01R 35/02 439/35 |
| 6,642,628 B2 | * | 11/2003 | Burdick | B60D 1/62 439/35 |
| 7,118,379 B1 | * | 10/2006 | Wang | H01R 13/6641 439/35 |
| 7,534,108 B1 | * | 5/2009 | Wang | B60D 1/64 439/35 |
| 2009/0263979 A1 | * | 10/2009 | Corless | H01R 39/64 439/35 |
| 2009/0302858 A1 | * | 12/2009 | Kulkarni | B60Q 1/305 324/504 |
| 2022/0363207 A1 | * | 11/2022 | Gallo | B60D 1/64 |

* cited by examiner

*Primary Examiner* — Hae Moon Hyeon
(74) *Attorney, Agent, or Firm* — DAY PITNEY LLP; George N. Chaclas; Anthony A. Kassas (57) ABSTRACT

An electrical adapter device for connecting a primary electrical system of a towing vehicle to a secondary electrical system of a towed vehicle includes an adapter primary connector, a second end, and a semiconductor device. The adapter primary connector is operable to detachably couple with a primary connector and comprises a primary electrical terminal. The second end is adapted to removably couple with a secondary connector and thereby electrically connect a secondary electrical system to a primary electrical system. The second end includes a secondary electrical terminal electrically connected to the primary electrical terminal. The semiconductor device is configured to switch between a first state in which the semiconductor device connects the primary electrical terminal to a resistive load and a second state in which the semiconductor device disconnects the primary electrical terminal from the resistive load.

20 Claims, 6 Drawing Sheets

TOWED VEHICLE WIRING ADAPTER WITH LOAD SWITCHING

BACKGROUND

An adapter is often used to adapt and connect towed vehicle wiring with that of a towing vehicle, such as a truck, and vice versa. Such an adapter allows lights and other indicators on a towed vehicle to be operated from the towing vehicle. However, some towing vehicles include sophisticated connection-detecting systems that determine whether electrical systems of towed vehicles are connected to the towing vehicles. The use of an adapter can cause such a system to erroneously fail to detect a connection to an electrical system of a towed vehicle. As a result, the user often must spend considerable time removing and reinstalling the adapter in an effort to troubleshoot.

The background discussion is intended to provide information related to the present disclosure which is not necessarily prior art.

SUMMARY OF THE DISCLOSURE

The present disclosure solves the above-described problems and other problems by providing an electrical adapter device that connects the primary electrical system to a resistive load to prevent false disconnection reports.

An electrical adapter device constructed according to an embodiment of the present disclosure is provided for connecting a primary electrical system of a towing vehicle to a secondary electrical system of a towed vehicle. The towing vehicle presents a primary connector which is connected to the primary electrical system and the secondary electrical system includes a secondary connector. The electrical adapter device includes an adapter primary connector, a end, and a semiconductor device. The adapter primary connector is operable to detachably couple with the primary connector and comprises a primary electrical terminal. The end is adapted to removably couple with the secondary connector and thereby electrically connect the secondary electrical system to the primary electrical system. The end includes a secondary electrical terminal electrically connected to the primary electrical terminal.

The semiconductor device is configured to switch between a first state in which the semiconductor device connects the primary electrical terminal to a resistive load and a second state in which the semiconductor device disconnects the primary electrical terminal from the resistive: load. By connecting the primary electrical terminal to the resistive load, the electrical adapter prevents the false disconnection report from the connection-detecting system of the towing vehicle.

An electrical adapter device constructed according to another embodiment of the present disclosure comprises an adapter primary connector, an end, a resistive load, a bandpass filter, and a semiconductor device. The adapter primary connector is operable to detachably couple with the primary connector and comprises a primary electrical terminal. The end is adapted to removably couple with the secondary connector and thereby electrically connect the secondary electrical system to the primary electrical system. The end includes a secondary electrical terminal electrically connected to the primary electrical terminal. The resistive load is connected to the primary electrical terminal. The bandpass filter is connected to the primary electrical terminal and is configured to pass a signal within a frequency range. The semiconductor device is connected to the bandpass filter and is configured to switch between a first state in which the semiconductor device connects the resistive load to ground when the signal within the frequency range is received from the bandpass filter and a second state in which the semiconductor device disconnects the primary electrical terminal from the resistive load.

An electrical adapter device constructed according to another embodiment of the present disclosure comprises an adapter primary connector, a end, a resistive load, a first semiconductor device, a bandpass filter, and a second semiconductor device. The adapter primary connector is operable to detachably couple with the primary connector and comprises a primary left terminal, a primary taillight terminal, and a primary right terminal. The end is adapted to removably couple with the secondary connector and thereby electrically connect the secondary electrical system to the primary electrical system. The end includes a secondary left terminal electrically connected to the primary left terminal, a secondary taillight terminal electrically connected to the primary taillight terminal, and a secondary right terminal electrically connected to the primary right terminal. The resistive load is connected to the primary left terminal, the primary taillight terminal, and the primary right terminal. The first semiconductor device is configured to switch between a conductive state in which the first semiconductor device connects the resistive load to ground and a nonconductive state in which the first semiconductor device disconnects the resistive load from ground. The bandpass filter is connected to the primary left terminal, the primary taillight terminal, and the primary right terminal. The bandpass filter is configured to pass a first signal within a frequency range from the primary left terminal, the primary taillight terminal, or the primary right terminal to the first semiconductor device so that the first semiconductor device switches to the conductive state when the first signal is passed. The second semiconductor device is configured to switch the first semiconductor device to the conductive state when a second signal below a frequency threshold is received from the primary left terminal, the primary taillight terminal, or the primary right terminal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

The drawing figures do not limit the present disclosure to the specific embodiments disclosed and described herein. The drawings are not necessarily to scale, emphasis instead being placed upon clearly illustrating the principles of the disclosure.

DETAILED DESCRIPTION OF THE EMBODIMENTS

The following detailed description of the disclosure references the accompanying drawings that illustrate specific embodiments in which the disclosure can be practiced. The embodiments are intended to describe aspects of the disclosure in sufficient detail to enable those skilled in the art to practice the disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
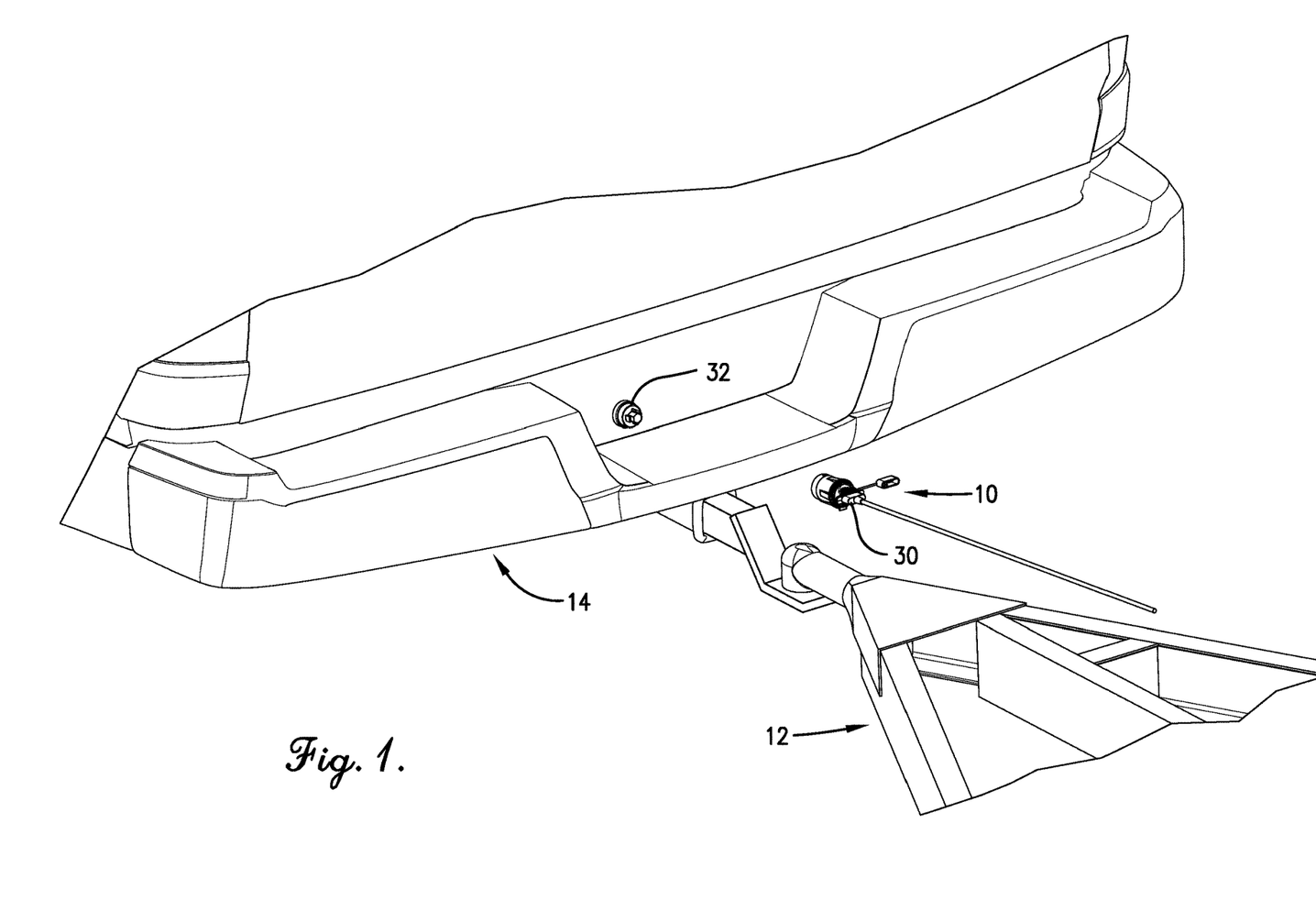
FIG. 1 is a perspective view of an electrical adapter constructed in accordance with a preferred embodiment of the present disclosure and illustrated connecting a towed vehicle's wiring to a towing vehicle's wiring.

Turning to FIG. 1, an electrical adapter 10 constructed in accordance with a preferred embodiment of the present disclosure is illustrated connecting a towed vehicle's 12 wiring to a towing vehicle's 14 wiring in order to allow the towed vehicle's 12 wiring to be controlled through the towing vehicle's 14 wiring. The towed vehicle 12 may be a trailer, a boat, a camper, or any other vehicle that can be towed behind another vehicle. For example, the towed vehicle 12 may be a conventional trailer which includes a chassis supported by one axle and two wheels. In addition, the chassis preferably includes one or more indicators, such as tail indicators, turn indicators, brake indicators, and/or running lights.

The towing vehicle 14 is typically a truck, but may be a van, a car, or some other motor vehicle. In any case, the towing vehicle preferably also has indicators, such as those described above. Each vehicle's 12,14 wiring comprises one or more circuits that operate the indicators. For example, when the towing vehicle 14 attempts to slow down, a brake indicator circuit may be used to illuminate the brake indicators on the towing vehicle 14 in order to warn: others and meet licensing requirements. The brake indicator circuit of the towing vehicle 14 may also be connected through the adapter 10 to a brake indicator circuit on the towed vehicle 12 in order to illuminate brake indicators on the towed vehicle 12. Thus, the adapter 10 allows circuits on the towed vehicle 12 to be powered or otherwise operated through circuits on the towing vehicle 14.

Figure 2:
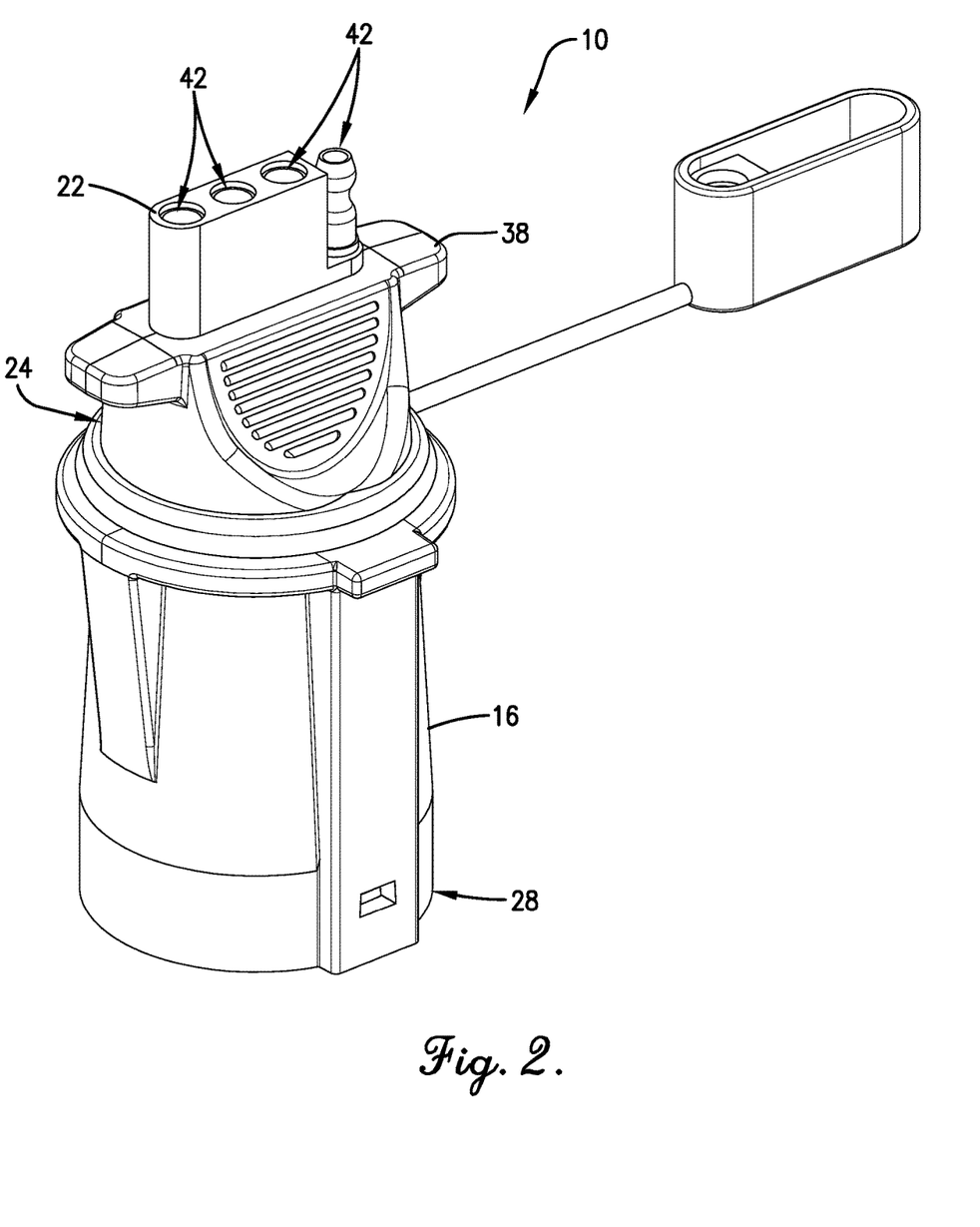
FIG. 2 is another perspective view of the adapter of FIG. 1 depicting a towed receptacle of the adapter.
Figure 3:
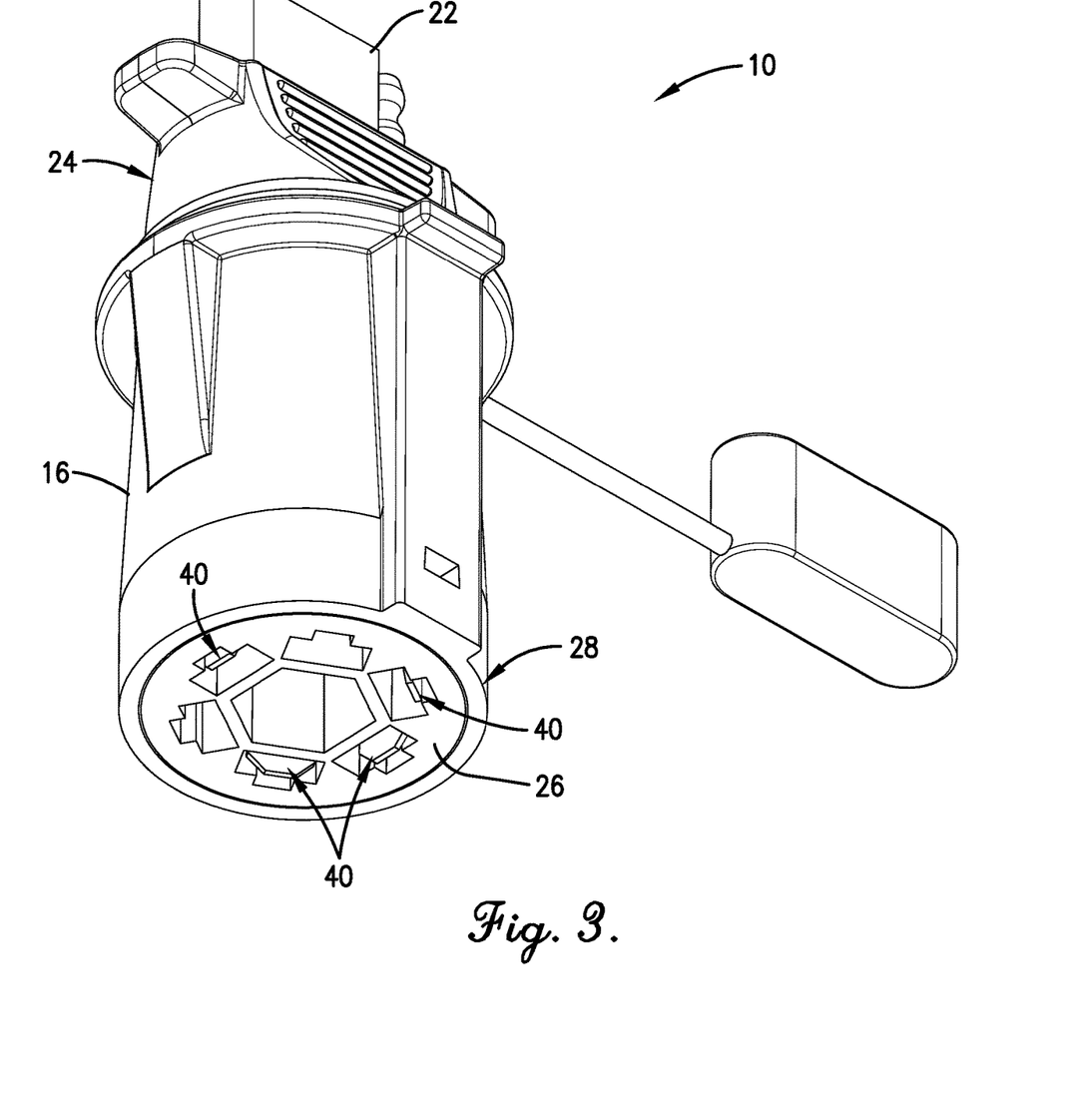
FIG. 3 is another view of the adapter of FIG. 1 depicting a towing receptacle of the adapter.
Figure 4:
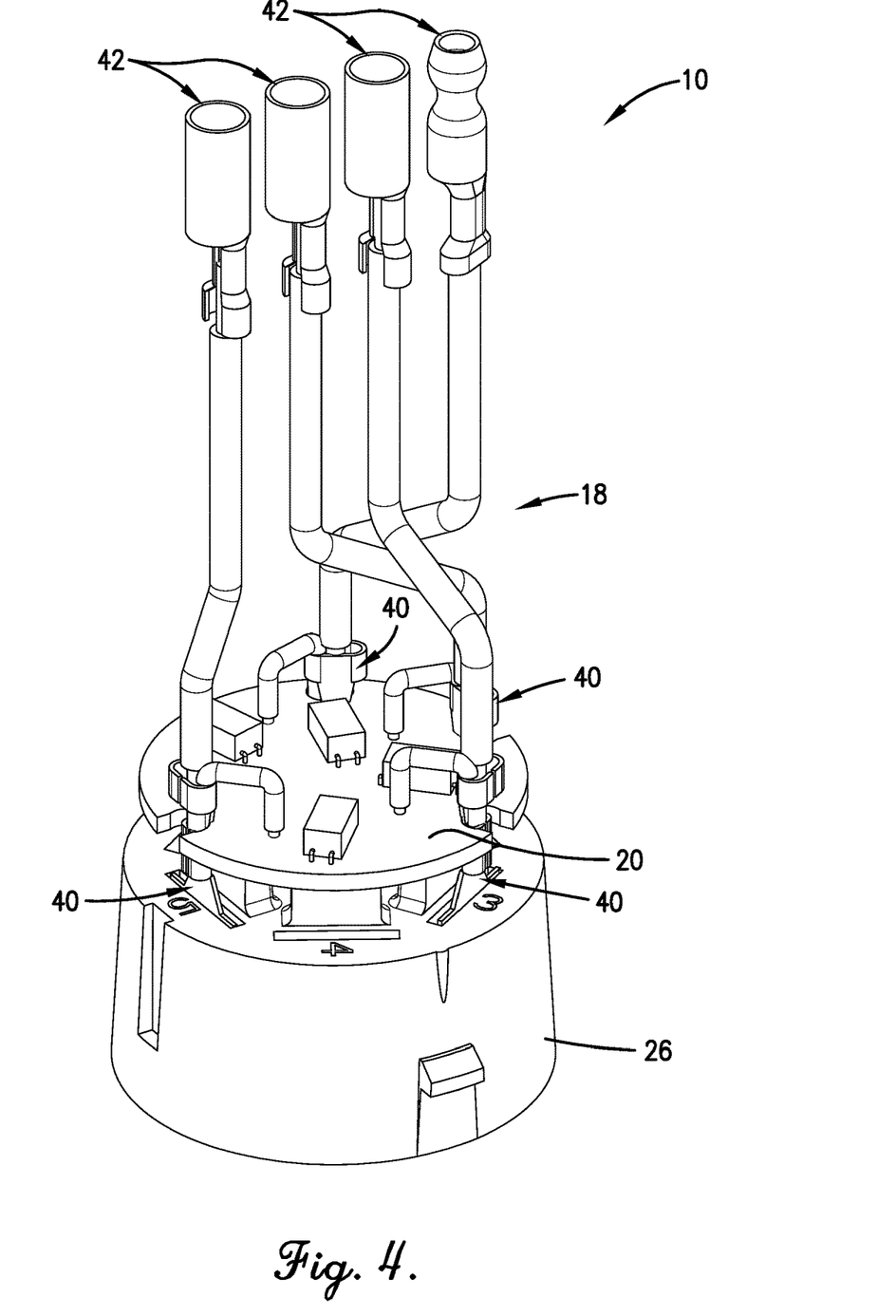
FIG. 4 is another perspective view of the adapter of FIG. 1, wherein a housing of the adapter is removed allowing components internal to the housing be viewed from outside the housing.

Referring also to FIGS. 2-4, the adapter 10 broadly comprises a housing 16 operable to physically connect the towed vehicle's 12 wiring to the towing vehicle's 14 wiring, a plurality of conductors 18 (depicted in FIG. 4) internal to the housing 16 each operable to electrically individually connect one of the towed vehicle's 12 circuits to one of the towing vehicle's 14 circuits, and a circuit board 20 (depicted in FIG. 4). The housing 16 includes a towed receptacle 22 mounted within an end 24 of the housing 16 for electrically coupling the adapter 10 with the towed vehicle's 12 wiring and a towing receptacle 26 (depicted in FIGS. 3 and 4) mounted within an adapter primary connector 28 of the housing 16 for electrically coupling the adapter 10 with the towing vehicle's 14 wiring. The housing 16 is preferably substantially cylindrical, approximately one and five eighths inches in diameter, and approximately three and one half inches long. The housing 16 is preferably constructed of plastic, but may be made of any other suitable material, such as metal or a composite material.

The towed receptacle 22 is preferably generally rectangular and preferably includes a plurality of terminals (discussed in further detail below) that electrically individually couple the conductors 18 of the adapter 10 with each of the towed vehicle's 12 circuits. The physical arrangement of the terminals of the towed receptacle 22 and the shape of the end 24 of the housing 16 combine to physically mate the adapter 10 to a plug or secondary connector 30 (depicted in FIG. 1) which terminates the towed vehicle's 12 wiring. The towing receptacle 26 is preferably circular and preferably includes a plurality of terminals (discussed in further detail below) that electrically individually couple the conductors 18 of the adapter 10 with selected ones of the towing vehicle's 14 circuits. The physical arrangement of the terminals of the second receptacle 26 and the shape of the adapter primary connector 28 of the housing 16 combine to physically mate the adapter 10 to a receiver or primary connector 32 which terminates the towing vehicle's 14 wiring. In this manner, the adapter 10 is operable to physically and electrically join the secondary connector 30 with the primary connector 32, thereby transmitting power and/or signals to the towed vehicle 12 from the towing vehicle 14.

The housing 16 includes at least one mating tab 38 to firmly grip the housing 16, when installing or removing the adapter 10.

The conductors 18 preferably comprise at least one conductor 18 for each of the towed vehicle's 12 circuits plus one ground conductor. For example, the conductors 18 may comprise the ground conductor, a left turn conductor, a right turn conductor, and a brake indicator conductor, where the secondary connector 30 of the towed vehicle 12 is a commonly used four-wire plug.

In order to make the towed vehicle's 12 wiring compatible with the towing vehicle's 14 wiring, the conductors 18 must be arranged in a specific electrical arrangement. The arrangement defines the manner in which the towed vehicle 12 is electrically connected to the towing vehicle 14 through the adapter 10. Thus, the arrangement is dependent upon specific characteristics of the towed vehicle 12 and the towing vehicle 14. For example, the secondary connector 30 of the towed vehicle 12 may be the four-wire plug, while the primary connector 32 of the towing vehicle 14 is a six or seven wire receiver. In this case, the adapter 10 would electrically connect to only those circuits of the towing vehicle 14 that correspond to one of the towed vehicle's 12 circuits, such as the tail indicator circuit.

In some cases, there is no separate tail indicator circuit. In these applications, turn indicator circuits typically provide the functionality of the tail indicator circuit or vice versa. For example, both turn indicator circuits of the towed vehicle 12 may be energized when the tail indicator circuit of the towing vehicle 14 is energized, thereby providing the functionality of the tail indicator circuit. Additionally, an appropriate one of the turn indicator circuits may be intermittently energized, thereby causing an appropriate turn indicator to flash indicating a turn and providing the functionality of the turn indicator circuit. In any case, the towed vehicle's 12 wiring preferably includes at least one brake indicator circuit and one tail indicator circuit or two turn indicator circuits.

Figure 5:
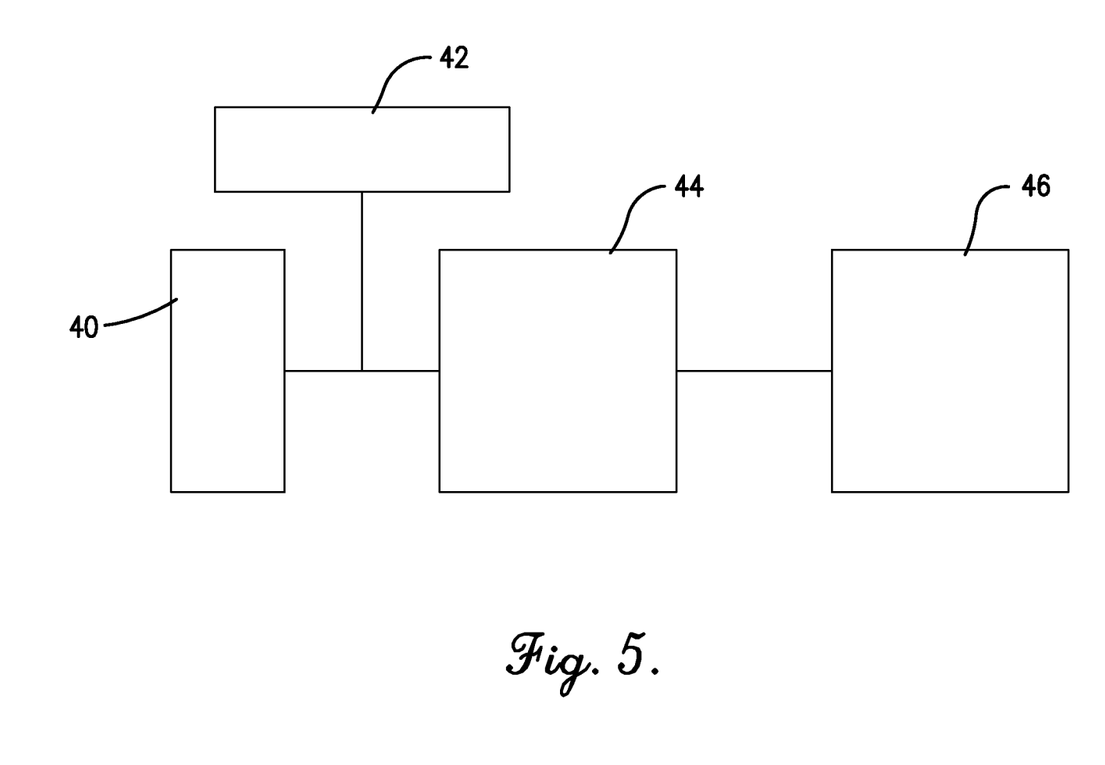
FIG. 5 is a block diagram depicting select components of the adapter of FIG. 1.

Turning to FIG. 5, a block diagram of select components of the adapter 10 is depicted. One or more of the select components may be located on or connected to the circuit board 20. As mentioned above, the receptacle 26 of the adapter primary connector 28 may generally include a plurality of primary terminals 40 for connecting to the wiring, or primary electrical system, or the towing vehicle 14. The receptacle 26 of the end 24 includes a plurality of conductive secondary terminals 42 for connecting to the wiring, or secondary electrical system, of: the towed vehicle 12. One or more of the secondary terminals 42 may be connected to one or more of the primary terminals 40 via the conductors 18, as depicted in FIG. 4.

The adapter 10 may include one or more semiconductor device 44 and a resistive load 46. The semiconductor device(s) 44 and the resistive load 46 may be secured to the circuit board 20. The semiconductor device 44 is configured to switch between a first state in which the semiconductor device 44 connects one or more of the primary terminals 40 to the resistive load 46 and a second state in which the semiconductor device 44 disconnects one or more of the primary terminals 40 from the resistive load 46. The semiconductor device 44 may broadly comprise one or more transistors, switches, diodes, microchips, microcontrollers, processing elements, filters, resistors, inductors, capacitors, or the like.

The semiconductor device 44 may be configured to automatically switch from the first state to the second state when a signal meeting certain conditions is received through the primary terminals 40. For example, the signal may be within a certain frequency range, be a direct current (DC) signal, and/or have a frequency below a threshold frequency.

In some embodiments, the semiconductor device 44 is configured to automatically switch from the first state to the second state when it receives a signal consistent with signals generated by the connection-detecting systems of the towing vehicle 14 through at least one of the primary terminals 40. For example, the signal may have a frequency range of about 0 Hz to about 1 kHz. In some embodiments, the frequency range is about 50 Hz to about 500 Hz, and in some embodiments, the frequency range is about 75 Hz to about 488 Hz. The semiconductor device 44 may be configured to switch to the first state for any signal consistent with a signal generated by the connection-detecting systems of the towing vehicle 14 without departing from the scope of the present disclosure. Connecting the primary terminals 40 to the resistive load 46 when such a signal is received enhances the use of adapters by helping the connection-detecting system of the towing vehicle 14 to accurately detect a connection between the adapter 10 and the primary connector 32.

In some embodiments, the semiconductor device 44 is configured to also automatically switch from the first state to the second state when it receives a signal consistent with a brake light signal, a turn signal, and/or any other signal for relaying to the electrical system of the towed vehicle 12. For example, the signal may have a DC component. In some embodiments, the semiconductor device 44 is configured to automatically switch from the first state to the second state when it receives a signal having a frequency below a threshold, such as 5 Hz or 1 Hz. The semiconductor device 44 may be configured to switch to the first state for a brake light signal, a turn signal, and/or any other signal for relaying to the electrical system of the towed vehicle 12 without departing from the scope of the present disclosure. Connecting the primary terminals 40 to the resistive load 46 when such a signal is received enhances the use of adapters by helping the connection-detecting system of the towing vehicle 14 to accurately detect a connection between the adapter 10 and the primary connector 32.

The resistive load 46 may include one or more resistors or other components that are electrically resistive. The resistive load 46 may be connected to one of the primary terminals 40 that is grounded and/or the semiconductor device 44 may be configured to connect the resistive load 46 to ground. As used herein, a resistive load could be a resistive element connected to ground to which the semiconductor device 44 connects at least one of the primary terminals 40, or it could be an ungrounded resistor that the semiconductor device 44 connects to ground. Further, the resistive load 46 and the semiconductor device 44 may be implemented in any package without departing from the scope of the present disclosure. For example, they may be implemented a plurality of separate components or integrated into one or more chips or components.

Figure 6:
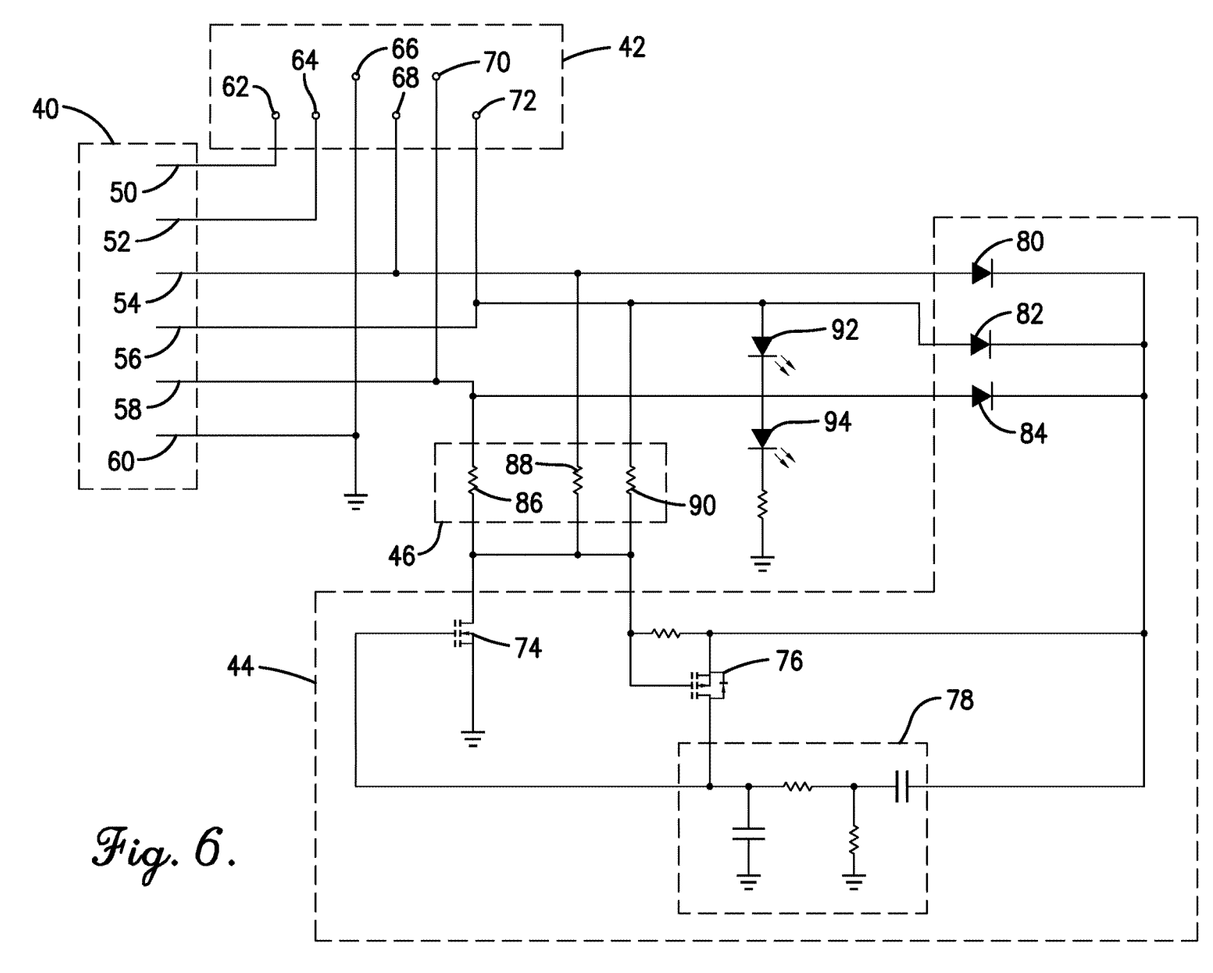
FIG. 6 is an example circuit diagram depicting select components of the adapter of FIG. 1.

Turning to FIG. 6, an exemplary circuit diagram of the adapter 10 according to an embodiment of the disclosure is depicted. The primary terminals 40 may include a primary auxiliary terminal 50, a primary electric brake terminal 52, a primary left terminal 54, a primary taillight terminal 56, a primary right terminal 58, and a primary ground terminal 60. Likewise, the secondary terminals 42 may include a secondary auxiliary terminal 62, a secondary electric brake terminal 64, a secondary left terminal 66, a secondary taillight terminal 68, a secondary right terminal 70, and a secondary ground terminal 72.

The semiconductor device 44 comprises a first transistor 74, a second transistor 76, a bandpass filter 78, and a plurality of diodes 80, 82, 84, and the resistive load 46 comprises a plurality of resistors 86, 88, 90. The first transistor 74 is configured to switch between a conductive state in which the first transistor 74 connects the resistive load 46, or one of the resistors 86, 88, 90, to ground and a nonconductive state in which the first transistor 74 disconnects the resistive load 46 from ground. The first transistor 74 may comprise an n-channel metal-oxide semiconductor field-effect transistor (MOSFET) with its gate connected to the output of the bandpass filter 78, its drain connected to the resistive load 46, and its source connected to ground. However, the first transistor 74 may be any other type of semiconductor device that performs this function without departing from the scope of the present disclosure. The first transistor 74 may be operable to automatically switch to the conductive state when the filter 78 passes a signal within a frequency range, as discussed above and below. When the signal is no longer present, the first transistor 74 may switch back to the nonconductive state, unless driven by the second transistor 76, as discussed below.

The second transistor 76 is configured to switch the first transistor 74 to its conductive state when a second signal below a frequency threshold and/or a DC signal is received from one of the primary terminals 40, such as the primary left terminal 54, the primary taillight terminal 56, and/or the primary right terminal 58. The second transistor 76 may be a p-channel MOSFET with its gate connected to the resistive load 46, its source connected to the diodes 80, 82, 84, and its drain connected to the gate of the first transistor 74. A voltage differential may be affected between its source and gate via a resistor. When a DC voltage and/or a signal below a threshold frequency is received from the one of the primary terminals 40, a difference in voltage is formed between the source and the gate, which causes the second transistor 76 to enter its active state. This results in the source passing the DC voltage and/or the signal (below the threshold frequency) to the gate of the first transistor 74. This causes the first transistor 74 to switch to and/or remain in the conductive state, thereby connecting the resistive load 46 to ground. When the DC signal and/or signal below the threshold frequency is no longer received from one of the primary terminals 40, the second transistor 76 shuts off, or enters an inactive state. This results in the first transistor 74 switching back to its nonconductive state, thereby disconnecting the resistive load 46 from ground (assuming no signal is passed through the filter 78). The second transistor 76 may be any other type of semiconductor device that performs this function without departing from the scope of the present disclosure. The signal may have a DC component and/or have a frequency below a threshold, such as 5 Hz or 1 Hz.

The band pass filter 78 is connected to the diodes 80, 82, 84 and configured to pass signals within a frequency range to the first transistor 74 so that the first transistor 74 switches to the conductive state when such signals are passed. For example, as discussed above, the signals may be within a frequency range of about 50 Hz to about 500 Hz, and in some embodiments, the frequency range is about 75 Hz to about 488 Hz. The band pass filter 78 may include a number of components, such as resistors, capacitors, and/or inductors, or the like without departing from the scope of the present disclosure.

The diodes 80, 82, 84 may be connected to one or more of the primary terminals 40, such as the primary left terminal 54, the primary taillight terminal 56, and/or the primary right terminal 58. The diodes 80, 82, 84 receive signals from the primary left terminal 54, the primary taillight terminal 56, and/or the primary right terminal 58 and drive the first transistor 74.

The resistors 86, 88, 90 of the resistive load 46 are connected to one or more of the primary terminals 40, such as the primary left terminal 54, the primary taillight terminal 56, and/or the primary right terminal 58. The resistors 86, 88, 90 are connected in parallel to the first transistor 74 so that any one of the primary left terminal 54, the primary taillight terminal 56, or the primary right terminal 58 may be grounded via the first transistor 74 if a certain signal is received therethrough. The resistors 86, 88, 90 may have a resistance of about 75 ohms to about 125 ohms, 90 ohms to about 110 ohms, or about 100 ohms.

The adapter 10 may include additional internal circuitry that monitors the towing vehicle's 14 wiring and generates appropriate signals for the towed vehicle's 12 wiring, thereby electrically isolating the vehicles 12,14 while simulating electrical connectivity. The adapter 10 may further include one or more light-emitting diodes (LED) 92, 94 connected to the primary taillight terminal 56.

An example discussion of the use and operation of the adapter 10 will now described. The adapter 10 may be plugged into the primary connector 32 of the towing vehicle 14, and the secondary connector 30 of the towed vehicle 12 may be plugged into the end 24 of the adapter 10. Periodically and/or right after a user turns on a turn signal, presses on the brakes, shifts the towing vehicle 14 into reverse, or performs some function that activates one of the lights of the vehicles 12, 14, the connection-detecting system of the towing vehicle 14 may send out a certain signal to detect whether the towed vehicle 12 is electrically connected to the primary connector 32.

The adapter 10 is configured to automatically present a load to the towing vehicle 14 that indicates a proper connection. The signal may be received by the adapter 10 through one of the primary terminals 40 of the receptacle 26 of the adapter primary connector 28. The primary terminal 40 then passes the signal through one of the conductors 18 to the semiconductor device 44, which may connect the primary terminal 40 to the resistive load 46. For example, the signal may be passed through one of the conductors 18 to the circuit board 20, and through one of its traces to one of the diodes 80, 82, 84. One of the diodes 80, 82, 84 may then pass the signal to the bandpass filter 78, which may only pass the signal to the first transistor 74 if the signal is within a certain frequency range. The signal may then be received at the gate of the first transistor 74, which causes the first transistor 74 to enter the conductive state. When in the conductive state, the first transistor 74 connects the resistors 86, 88, 90 to ground, thereby presenting to the towing vehicle 14 that a load is present, and a proper connection is made. When the signal is no longer received, the first transistor 74 automatically disconnects the resistive load 46 from ground to save energy.

The adapter 10 is configured to present a load to the towing vehicle 14 when a turn signal is activated, a brake light is activated, a taillight is activated, or the like. When a user turns on a turn signal, presses on the brakes, shifts the towing vehicle 14 into reverse, or performs some function that activates one of the lights of the vehicles 12, 14, a signal may be generated from the towing vehicle 14 to activate one of the lights of the towed vehicle 12. The signal may be a DC signal, such as brake lights or taillights, and/or a signal that is at or below a certain frequency, such as a frequency of 1 Hz (e.g., a turn signal). The signal may be received by the adapter 10 through one of the primary terminals 40 and passed to the secondary terminals 42. The signal may also be received by the diodes 80, 82, 84, which pass it to the source of the second transistor 76. A voltage differential is formed between the source and gate of the second transistor 76, which causes the second transistor 76 to switch to an active state. In the active state, the voltage at the source of the second transistor 76 is passed to its drain, which is connected to the gate of the first transistor 74. This causes the first transistor 74 to switch and/or maintain its conductive state in which it connects the resistors 86, 88, 90 of the resistive load 46 to ground. This causes the adapter 10 to present a load to the towing vehicle 14 while the lights are in use. When the signal is no longer received, the resistive load 46 is disconnected from ground to save energy.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising." "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the disclosure has been described with reference to the embodiments illustrated in the attached drawing figures, it is noted that equivalents may be employed and substitutions made herein without departing from the scope of the disclosure as recited in the claims.

Having thus described various embodiments of the disclosure, what is claimed as new and desired to be protected by Letters Patent includes the following:

1. An electrical adapter device for connecting a primary electrical system of a towing vehicle to a secondary electrical system of a towed vehicle, wherein the towing vehicle presents a primary connector which is connected to the primary electrical system and the secondary electrical system includes a secondary connector, the electrical adapter device comprising:
   an adapter primary connector operable to detachably couple with the primary connector and comprising a primary electrical terminal;
   a towed receptacle adapted to removably couple with the secondary connector and thereby electrically connect the secondary electrical system to the primary electrical system, the towed receptacle including a secondary electrical terminal electrically connected to the primary electrical terminal; and
   a semiconductor device configured to switch between a first state in which the semiconductor device connects the primary electrical terminal to a resistive load and a second state in which the semiconductor device disconnects the primary electrical terminal from the resistive load.

2. The electrical adapter device of claim 1, wherein the semiconductor device is configured to switch to the second state when a signal is received from the primary electrical terminal.

3. The electrical adapter device of claim 2, wherein the signal comprises at least one of a first signal having a frequency within a frequency range, a second signal having a frequency below a frequency threshold, or a third signal having a positive direct current voltage.

4. The electrical adapter device of claim 3, wherein the frequency range is 78 Hz to 488 Hz.

5. The electrical adapter device of claim 3, wherein the frequency threshold is 1 Hz.

6. The electrical adapter device of claim 1, wherein the semiconductor device comprises:
   a first transistor connecting the resistive load to ground, the first transistor being configured to switch between a first state in which the first transistor connects the resistive load to ground and a second state in which the first transistor disconnects the resistive load from ground, and
   a second transistor configured to switch between an active state in which the second transistor switches the first transistor to the first state and an inactive state in which the second transistor does not switch the first transistor to the first state.

7. The electrical adapter device of claim 6, wherein the primary electrical terminal is a primary left terminal, and the adapter primary connector includes a primary taillight terminal and a primary right terminal, and the resistive load comprises three resistors connected to the primary left terminal, the primary taillight terminal, and the primary right terminal, and the three resistors are connected to the first transistor in parallel.

8. The electrical adapter device of claim 6, further comprising a bandpass filter configured to receive a signal from the primary electrical terminal and pass a signal within a frequency range to the first transistor.

9. The electrical adapter device of claim 8, further comprising a diode connecting the primary electrical terminal and the bandpass filter.

10. The electrical adapter device of claim 1, wherein the resistive load comprises a resistor with a resistance of 90 ohms to 110 ohms.

11. An electrical adapter device for connecting a primary electrical system of a towing vehicle to a secondary electrical system of a towed vehicle, wherein the towing vehicle presents a primary connector which is connected to the primary electrical system and the secondary electrical system includes a secondary connector, the electrical adapter device comprising:
   an adapter primary connector operable to detachably couple with the primary connector and comprising a primary electrical terminal;

a towed receptacle adapted to removably couple with the secondary connector and thereby electrically connect the secondary electrical system to the primary electrical system, the towed receptacle including a secondary electrical terminal electrically connected to the primary electrical terminal;

a resistive load connected to the primary electrical terminal;

a bandpass filter connected to the primary electrical terminal and configured to pass a signal within a frequency range; and a semiconductor device connected to the bandpass filter and configured to switch between a first state in which the semiconductor device connects the resistive load to ground when the signal within the frequency range is received from the bandpass filter and a second state in which the semiconductor device disconnects the primary electrical terminal from the resistive load.

12. The electrical adapter device of claim 11, wherein the semiconductor device is configured to switch to the first state when a second signal below a frequency threshold is received from the primary electrical terminal.

13. The electrical adapter device of claim 12, wherein the frequency range is 78 Hz to 488 Hz and the frequency threshold is 1 Hz.

14. The electrical adapter device of claim 11, wherein the semiconductor device comprises two transistors.

15. An electrical adapter device for connecting a primary electrical system of a towing vehicle to a secondary electrical system of a towed vehicle, wherein the towing vehicle presents a primary connector which is connected to the primary electrical system and the secondary electrical system includes a secondary connector, the electrical adapter device comprising:

an adapter primary connector operable to detachably couple with the primary connector and comprising a primary left terminal, a primary taillight terminal, and a primary right terminal;

a towed receptacle adapted to removably couple with the secondary connector and thereby electrically connect the secondary electrical system to the primary electrical system, the towed receptacle including:

a secondary left terminal electrically connected to the primary left terminal, a secondary taillight terminal electrically connected to the primary taillight terminal, and a secondary right terminal electrically connected to the primary right terminal;

a resistive load connected to the primary left terminal, the primary taillight terminal, and the primary right terminal;

a first semiconductor device configured to switch between a conductive state in which the first semiconductor device connects the resistive load to ground and a nonconductive state in which the first semiconductor device disconnects the resistive load from ground;

a bandpass filter connected to the primary left terminal, the primary taillight terminal, and the primary right terminal, the bandpass filter being configured to pass a first signal within a frequency range from the primary left terminal, the primary taillight terminal, or the primary right terminal to the first semiconductor device so that the first semiconductor device switches to the conductive state when the first signal is passed; and a second semiconductor device configured to switch the first semiconductor device to the conductive state when a second signal below a frequency threshold is received from the primary left terminal, the primary taillight terminal, or the primary right terminal.

16. The electrical adapter device of claim 15, wherein the frequency range is 78 Hz to 488 Hz.

17. The electrical adapter device of claim 15, wherein the frequency threshold is 1 Hz.

18. The electrical adapter device of claim 15, wherein the second signal is a generally a positive direct current voltage.

19. The electrical adapter device of claim 15, further comprising diodes connecting the primary left terminal, the primary taillight terminal, and the primary right terminal to the bandpass filter.

20. The electrical adapter device of claim 15, further comprising a light-emitting diode electrically connected to the primary taillight terminal.

* * * * *